US007176463B2

(12) United States Patent
Eskildsen

(10) Patent No.: US 7,176,463 B2
(45) Date of Patent: Feb. 13, 2007

(54) METHOD AND APPARATUS FOR LARGE SIGNAL DETECTION IN PASSIVE INFRARED SENSOR APPLICATIONS

(75) Inventor: Kenneth G Eskildsen, Great Neck, NY (US)

(73) Assignee: Honeywell International, Inc., Morristown, NJ (US)

( * ) Notice: Subject to any disclaimer, the term of this patent is extended or adjusted under 35 U.S.C. 154(b) by 201 days.

(21) Appl. No.: 10/893,040

(22) Filed: Jul. 15, 2004

(65) Prior Publication Data

US 2006/0011843 A1 Jan. 19, 2006

(51) Int. Cl.
*G01J 5/02* (2006.01)

(52) U.S. Cl. ................................ 250/342; 250/DIG. 1

(58) Field of Classification Search .......... 250/DIG. 1, 250/342
See application file for complete search history.

(56) References Cited

U.S. PATENT DOCUMENTS 5,453,733 A * 9/1995 Peterson et al. ............ 340/567
5,693,943 A * 12/1997 Tchernihovski et al. .... 250/342
5,703,368 A * 12/1997 Tomooka et al. ........... 250/349
6,642,846 B1 * 11/2003 Krubiner et al. ......... 340/545.3

FOREIGN PATENT DOCUMENTS

JP 57101872 A * 6/1982

* cited by examiner

*Primary Examiner*—Constantine Hannaher
(74) *Attorney, Agent, or Firm*—John F. Beninati; Robert S. Smith

(57) ABSTRACT

Apparatus for passive infrared sensing of an intruder that discriminates between signals corresponding to a human target and much larger signals may include first and second IR sensors, at least a first amplifier having a first voltage operating range. The first amplifier may be connected to the first IR sensor and the apparatus may further include at least a second amplifier having a second voltage operating range. The second amplifier may also be connected to the first IR sensor and the apparatus may further include a comparator for comparing the respective outputs of the first and second amplifiers to predetermined values. The invention also includes the method for differentiating between a signal caused by human target and a signal caused by other much larger by IR sources which includes providing at least a first IR sensor, providing at least a first amplifier connected to the first IR sensor, providing a second amplifier connected to the first IR sensor having a second operating range, comparing the outputs of said first and second amplifiers to predetermined values to differentiate between the output from a sensor corresponding to the maximum signal for human target and a signal that is larger than the maximum signal from a human target.

44 Claims, 3 Drawing Sheets

PRIOR ART

METHOD AND APPARATUS FOR LARGE SIGNAL DETECTION IN PASSIVE INFRARED SENSOR APPLICATIONS

BACKGROUND OF THE INVENTION

The invention relates to security systems and particularly to intrusion detectors that utilize a passive infrared sensor (PIR) to detect the presence of an intruder within the protected area by sensing the heat emitted by the intruder's body. The PIR sensor has a detector that outputs a signal that is proportional to the difference between the intruder's body temperature and the background temperature of the sensor's field of view. This signal is amplified to levels compatible with the sensor's processing logic. The processing logic contains a thresholding means and will output an alarm signal if a minimum threshold is exceeded. One of the major drawbacks with this arrangement is that an alarm signal is generated when the minimum threshold is exceeded regardless of the source of the signal For example, an active space heater in the detector's field of view will generate a signal approximately ten times larger than that of an intruder. Unfortunately, the processing circuit is blind to the upper bound of the signal and generates a false alarm signal.

SUMMARY OF THE INVENTION

It is an object of the present invention to provide a method and apparatus that includes an IR processing circuit arrangement that will detect IR signals that are grossly larger than typical IR signals generated by an intruder.

Still another object of the invention is to provide a method and apparatus which when such large signals are detected, the processing logic will output a trouble signal to the alarm control panel.

Yet another object invention is to provide a method and apparatus that will send a trouble signal to inform the central station that the sensor has detected a disturbance within the detector's field of view that will impair the detector's performance.

It has now been found that these and other objects of the invention may be attained in apparatus for passive infrared sensing of an intruder that discriminates between signals corresponding to a human target and much larger signals which includes at least a first IR sensor and at least a first amplifier having a first voltage operating range. The first amplifier is connected to the first IR sensor. The apparatus also includes at least a second amplifier having a second voltage operating range. The second amplifier is connected to the first IR sensor and the apparatus also includes a first comparator for comparing the output of one of the amplifiers to a predetermined limit. The apparatus may also use a two-stage amplifier connected to the IR sensor In some forms of the apparatus the first amplifier has a higher gain than the second amplifier. The first amplifier may saturate in response to output from the sensor corresponding to the maximum signal as a result of the sensor sensing a human target. The second amplifier operates at a lower gain than the first. Both amplifiers will saturate when a hotter than human target is detected.

The apparatus for passive infrared sensing of an intruder that discriminates between signals corresponding to a human target and much larger signals may include at least a first IR sensor, and at least a first amplifier having a first amplification factor. The first amplifier may be connected to the first IR sensor and the apparatus may further include at least a second amplifier having a second amplification factor. The second amplifier may be connected to said second IR sensor and the apparatus may further include first and second comparators for comparing the respective outputs of the first and second amplifiers with respective first and second predetermined threshold values.

In some cases the first amplifier operates at a higher gain than the second amplifier. The first amplifier may saturate at an output from the first sensor corresponding to the maximum signal as a result of the sensor sensing a human target. The comparators may provide digital outputs indicating which of two amplifiers are above the respective predetermined thresholds. The amplifiers may be linear amplifiers.

Other forms of the apparatus for passive infrared sensing of an intruder that discriminates between signals corresponding to a human target and much larger signals include at least a first IR sensor, a first amplifier having first and second stages and having a first voltage operating range. The first amplifier may be connected to the first IR sensor. The apparatus may also include at least a second amplifier having a second voltage operating range. The second amplifier may be connected to the first IR sensor in the apparatus and may further include comparators for comparing the respective outputs with respective predetermined thresholds.

In some forms of this apparatus the first amplifier may saturate at an output from the sensor corresponding to the maximum signal as a result of the sensor sensing a human target. The second amplifier may saturate in response to a signal that is much higher than a human and indicate a trouble condition. Each of the amplifiers may be a linear amplifier.

The invention also includes the method for differentiating between a PIR signal caused by human target and a signal caused by other much larger IR sources which includes providing at least a first IR sensor, providing at least a first amplifier connected to the first IR sensor, providing a second amplifier connected to the first IR sensor having a second operating range, comparing the output of at least one of the first and second amplifiers to differentiate between the output from a sensor corresponding to the maximum signal for human target and a signal that is larger than the maximum signal from a human target.

In some cases the step of providing a first amplifier includes providing an amplifier that will saturate at substantially the maximum signal from the sensor produced by human target. The step of comparing the output to a predetermined value may include providing and using a comparator. The step of comparing may include the use of respective comparators to provide digital outputs indicating when respective outputs exceed predetermined values. The step of providing a first amplifier may include providing a first amplifier having first and second stages.

In other embodiments of the invention the method for differentiating between signals caused by human target and other much larger by IR sources includes the steps of providing first and second IR sensors, providing a first amplifier connected to the first IR sensor having a first operating range, providing a second amplifier connected to the second IR sensor having a second operating range, comparing the outputs of the first and second amplifiers to differentiate between the output from a sensor corresponding to the maximum signal for human target and a signal that is larger than the maximum signal from a human target. The step of providing a first amplifier may include providing an amplifier that will saturate at substantially the maximum signal from the sensor produced by human target. The step of comparing the outputs may include the use of a comparator or microprocessor. The step of comparing may include the use of a comparator that provides a digital output indicating which of two analog inputs are greater than predetermined thresholds. The step of providing a first amplifier may include providing a first amplifier having first and second stages.

BRIEF DESCRIPTION OF THE DRAWING

The invention will be better understood by reference the accompanying drawing in which.

DESCRIPTION OF THE PREFERRED EMBODIMENTS

Figure 1:
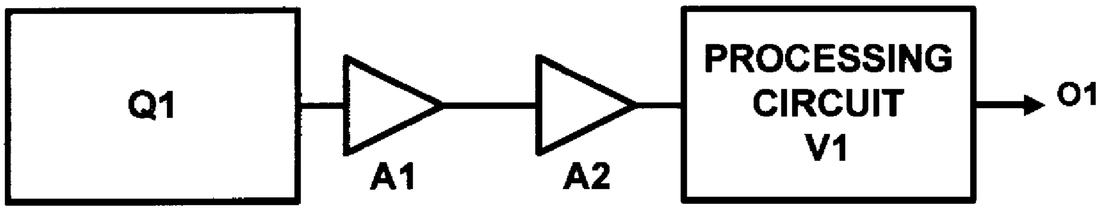
FIG. 1 is a block diagram of a typical prior art prior passive infrared detector.

There are a variety of central station systems intended for homeowners, business owners, and other potential targets for burglary, that are monitored by a central station. These systems are vastly superior to older systems that merely sound a bell or alarm. They have also largely replaced systems that were tied in directly to the local police station. As the use of burglar alarms increased, the local police departments began turning down more and more requests to be "hooked-up." As a result, there became a demand for central stations, or companies whose specialty it was to simply monitor burglar alarms. Most police departments will still allow banks and large jewelry stores a direct link to the police station, but as a rule, homeowners are excluded. So as the demand for security has risen, many guard agencies and burglar alarm installers have begun to offer centralized monitoring as an option for their clients.

When such systems are installed, it is common for them to be connected by a dedicated telephone line to the central station. Other systems utilize radio frequency and the internet to connect to the central station. In the event of an intrusion, the control panel (also known as a security panel) on the premises being monitored calls up the central station and gives an electronic message to the answering computer. It tells the computer exactly which switch or sensor has been violated, and the computer then tells the operator what has happened. For example if a burglar entered through a broken window, the panel would connect with the central station computer and tell it that zone 4, a first floor window, has been broken. The operator would then see on his computer screen that Acct. #1234, the Johnson residence has had zone 4, the window foiling on the living room window, violated. As the thief progresses through the house, the panel would call the central station for every sensor that was violated. The operator may then receive 1234-17, meaning that zone 17, a passive Infra-Red detector in the master bedroom, has detected someone. In some cases pre-amplified microphones allow audio monitoring of the protected premises. The operator would then be fairly sure someone was in the house, so the operator would have three options. The operator may just send the companies guards to the scene, call 911 and dispatch the police, or he may send both the police and the guards.

Passive Infra-Red alarms, or PIRs are so called because they do not emit Infra-Red energy, but merely detect a change in Infra-Red energy. A PIR probes its monitoring area, and if any changes are detected in Infra-Red (heat), it triggers an alarm. A PIR records the ambient room temperature so it will notice any changes such as that produced by the human body. Slow temperature changes, such as thermostatically controlled heating systems, will not interfere with the PIR's function. The PIR is often called a thermal detector; however such heat detectors are used primarily for fire prevention. The PIR is immediately recognizable by its shape and mounting location. They are very common in museums, banks, and other places where high-security is desired.

Due to the nature of a PIR, they are usually placed in a very conspicuous location, such as in the corner of a room. The range of the PIR can be 70 feet or more, although a PIR's probing pattern usually only monitors an area of about 20 feet square. Some of these devices are sold over-the-counter, although a great many are professionally installed. The greater the difference between room temperature and the temperature of the source of violation, the more efficiently the PIR will work. As the gap between room temperature and the temperature of the violator narrows, the efficiency of the PIR also decreases.

The use of passive infrared sensors (PIR) as part of intrusion detection systems is further described in the art. See U.S. Pat. No. 4,746,809 having the same assignee as the present application and issued to Coleman, et al. on May 24, 1988. This patent is incorporated by reference. The patent refers to an infrared detector or IR sensor module that may be a commercially available device that detects infrared radiation. In the disclosed embodiment of the present invention, the sensor module is utilized as an intrusion detector, for detecting the presence of living bodies passing within the range of the sensor module. Such a presence causes the output of the sensor module to go either high or low.

Another example of a similar prior art passive infra red detector (PIR) is shown in U.S. Pat. No. 6,188,318 issued to Fred Katz, et al. on Feb. 13, 2001 and now having the same assignee as the present application. This patent is incorporated by reference.

Referring now to the drawing and particularly to the first preferred embodiment, FIG. 1 illustrates a typical prior art passive infrared detector. The apparatus includes an IR sensor, Q1, an amplifier stage A1, an amplifier stage A2, and an IR signal processing circuit V1. It is customary to design such devices so that the amplifier stages A1, A2 will saturate in response to signals generated by intruders and hotter household objects. Because of this saturation the prior art devices cannot distinguish between signals generated by intruders and hotter household objects.

Saturation of an amplifier will be better understood by consideration of the following. The input-to-output voltage relationship for a linear amplifier has a characteristic in one described by $$V_{out}=\alpha V_{in}$$

Where the amplifier gain is $\alpha$. An amplifier saturates when the predicted output voltage exceeds the operating voltage range of the amplifier. The upper or lower extremes of the waveform are clipped off at the amplifier's operating limits. Thus, the voltage out of the amplifier does not increase with an increase of the voltage into the amplifier.

Figure 2:
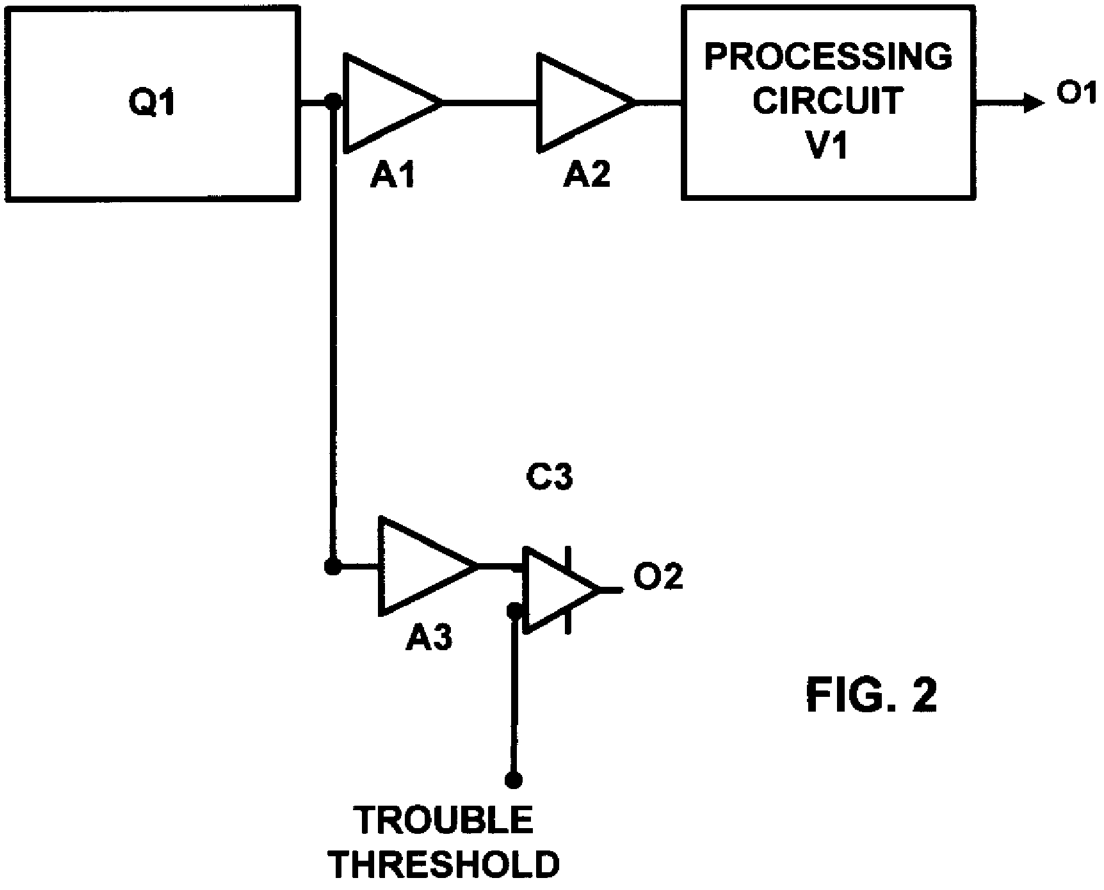
FIG. 2 is a block diagram of a passive infrared detector in accordance with a first preferred embodiment of the present invention.

FIG. 2 illustrates is a block diagram of a passive infrared detector block diagram apparatus in accordance with a first preferred embodiment of the present invention. The improvement is the addition of large signal detection circuit that includes a low gain amplifier A3 and a comparator C3. The gain of the amplifier A3 is chosen such that a strong IR signal will not cause its output to saturate. Thus, the output of the amplifier A3 will increase with increasing IR signal including IR signals initiated by objects that are hotter than the maximum human target. This is beneficial because the combination of amplifiers A1 and A2 will saturate in response to the same large signal input and thus the outputs of amplifiers A1 and A2 will not increase with increasing strong IR signal. The comparator C3 will generate a trouble output signal O2 when the low gain amplifier A3 output exceeds the trouble threshold. The trouble threshold is chosen such that the worst case human target will not exceed that value. Signals created from hotter than human targets will exceed the threshold and generate a trouble output O2.

The comparator C3 is used to provide a digital output indicating which of two analog input voltages is larger. It is a single bit analog-to-digital converter. The comparator is very similar to an operational amplifier but has a digital true/false output. Some embodiments may use discrete sensors respectively connected to the amplifiers A1 and A3. Other embodiments, like the illustrated embodiment, may use a single sensor Q1 having output to at least two amplifiers. Although the described preferred embodiment utilizes two amplifiers or amplifier stages A1 and A2 in series it will be understood that other embodiments may use only a single amplifier stage. A conventional processing circuit V1 produces an output signal O1.

Figure 3:
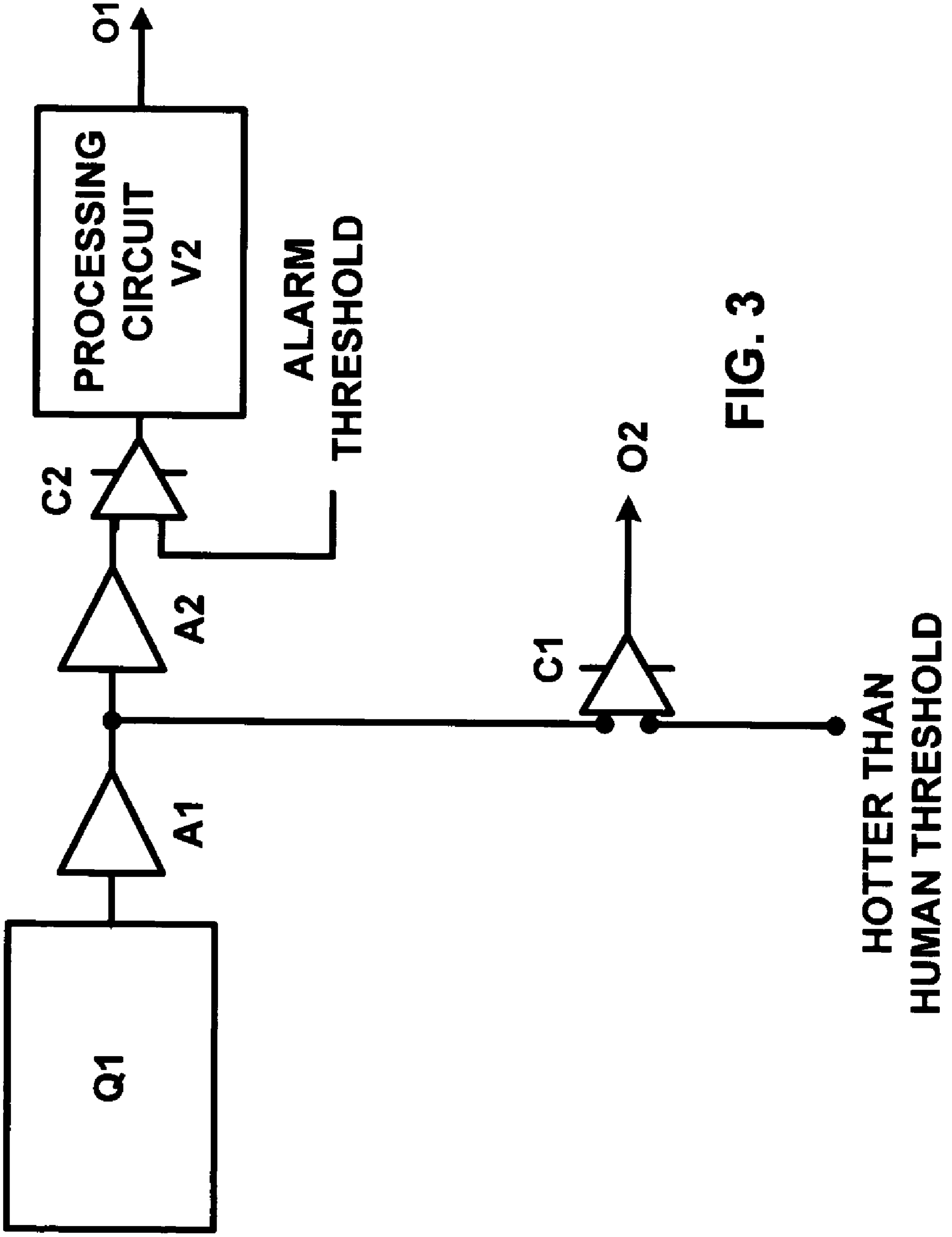
FIG. 3 is a block diagram of a passive infrared detector in accordance with a second preferred embodiment of the present invention.

A second preferred embodiment of the invention is illustrated in FIG. 3. This embodiment includes an IR sensor Q1, an amplifier A1, an amplifier A2, a comparator C1 and a comparator C2. The output signal from the IR sensor Q1 is coupled to the input of amplifier A1. The output signal from A1 is coupled to the input of amplifier A2 and the input of comparator C1. The output signal from amplifier A2 is coupled to comparator C2. Comparator C2 is the alarm threshold comparator. Comparator C1 is the "hotter than human" threshold comparator. The combination of gain and threshold for the amplifiers A1, A2 and the comparators C1, C2 guarantee that the comparator C1 will trip before the comparator C2.

The elements of this embodiment may, for example, include IR sensor Q1 that is a Nicera RE200, amplifiers A1 and A2 that are identified by the industry designation LM358 Single Supply Dual Operational Amplifier and comparators C1 and C2 that are identified by the industry designation LM339 Low Power Low Offset Voltage Quad Comparator.

Typical threshold values in the second embodiment for human targets are on the order of 0.5 volts and Gain/Threshold=2500/0.5=5000.

Typical threshold values in the second embodiment for hotter than human targets are on the order of 0.25 volts and Gain/Threshold=150/0.25=600

The respective methods and systems in accordance with the present system may utilize a computer that includes a microprocessor and memory and which cooperates with software that is commercially available or within the skill of practitioners in the programming arts.

Figure 4:
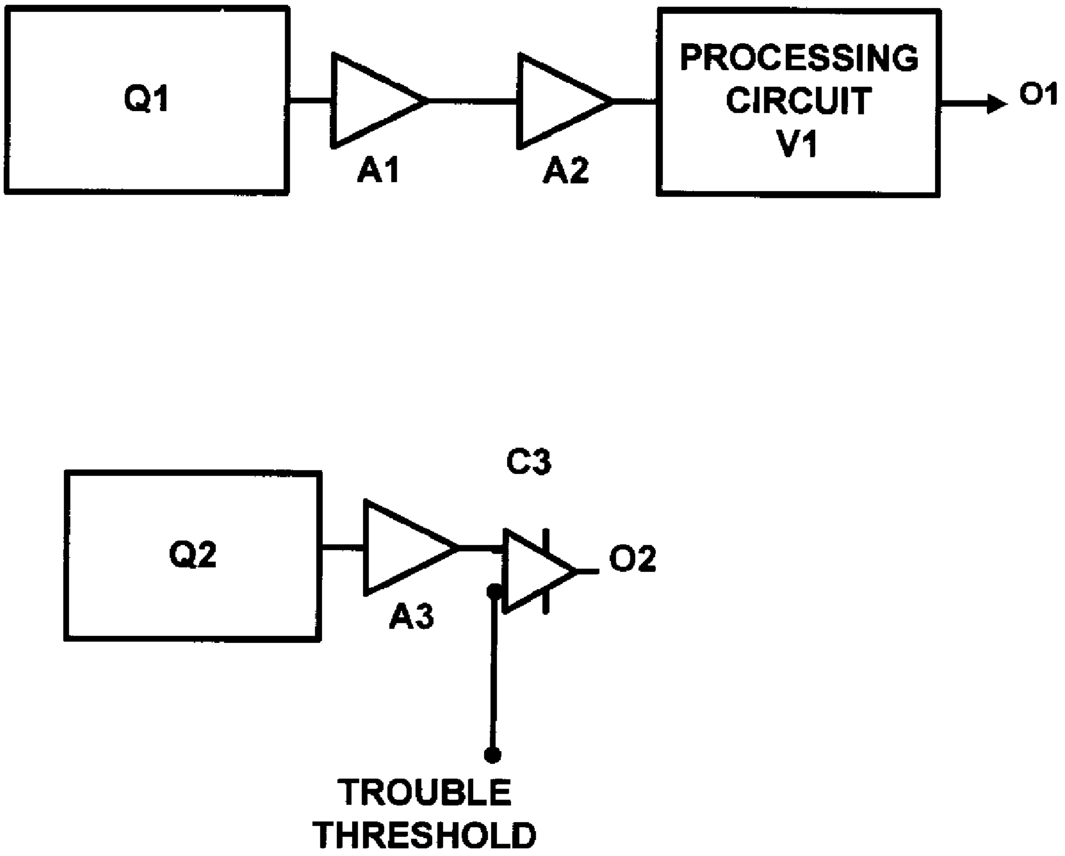
FIG. 4 is a block diagram of a passive infrared detector in accordance with a third embodiment that is similar to the first embodiment illustrated in FIG. 2.

FIG. 4 is a block diagram of a passive infrared detector in accordance with a third embodiment that is similar to the first embodiment illustrated in FIG. 2. This embodiment includes a discrete IR sensor Q2 cooperating with the amplifier A2.

The present invention has been described in terms of an ASIC. Those skilled in the art will recognize that in other embodiments discrete components may be utilized. Alternatively, a microprocessor and memory together with software known or obvious to those skilled the art may implement the present invention. While a single IR sensor is shown in the FIG. 2 preferred embodiments, it will be understood that other embodiments, such as that shown in FIG. 4, may use two or more IR sensors feeding respective amplifiers.

Although the description above contains many specifics, these should not be construed as limiting the scope of the invention, but as merely providing illustrations of some of the presently preferred embodiments of this invention. Thus, the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. Apparatus for passive infrared sensing of an intruder that discriminates between signals corresponding to a human target and much larger signals which comprises:

at least a first IR sensor;

at least a first amplifier having a first voltage operating range, said first amplifier being connected to said first IR sensor;

at least a second amplifier having a second voltage operating range, said second amplifier being connected to said first IR sensor; and a comparator for comparing the outputs of said second amplifier to a predetermined value.

2. The apparatus as described in claim 1 wherein said first amplifier operates at a lower voltage operating range than said second amplifier.

3. The apparatus as described in claim 2 wherein each of said amplifiers is a linear amplifier.

4. The apparatus as described in claim 1 said first amplifier saturates at an output from said sensor corresponding to the maximum signal as a result of the sensor sensing a human target.

5. The apparatus as described in claim 1 wherein said comparator provides a digital output indicating when said second amplifier has an output corresponding to hotter than human thresholds.

6. The apparatus as described in claim 1 wherein each of said amplifiers is a linear amplifier.

7. The apparatus as described in claim 1 wherein the predetermined value is approximately 0.25 volts.

8. The apparatus as described in claim 1 wherein said second amplifier has a gain of approximately 150.

9. Apparatus for passive infrared sensing of an intruder that discriminates between signals corresponding to a human target and much larger signals which comprises:

at least a first IR sensor and a second IR sensor;

at least a first amplifier having a first voltage operating range, said first amplifier being connected to said first IR sensor;

at least a second amplifier having a second voltage operating range, said second amplifier being connected to said second IR sensor; and first and second comparators for respectively comparing the outputs of said first and second amplifiers with respect to first and second pre-determined thresholds.

10. The apparatus as described in claim 9 wherein said first amplifier operates at a lower voltage operating range than said second amplifier.

11. The apparatus as described in claim 9 said first amplifier saturates at an output from said first sensor corresponding to the maximum signal as a result of the sensor sensing a human target.

12. The apparatus as described in claim 9 wherein said first and second comparators provide digital outputs indicating respectively if the outputs of said first and second amplifiers correspond to exceeding respectively human and hotter than human thresholds.

13. The apparatus as described in claim 9 wherein said second predetermined threshold is approximately 0.25 volts.

14. The apparatus as described in claim 9 wherein said second amplifier has a gain of approximately 150.

15. The apparatus as described in claim 9 wherein said first predetermined threshold is approximately 0.5 volts.

16. The apparatus as described in claim 9 wherein said second amplifier has a gain of approximately 150.

17. Apparatus as described in claim 9 wherein the combination of gain and threshold for said first and second amplifiers and said first and second predetermined threshold will cause the same one of the comparators to always trip before the other.

18. Apparatus for passive infrared sensing of an intruder that discriminates between signals corresponding to a human target and much larger signals which comprises:

at least a first IR sensor;

a first amplifier having first and second stages and having a first voltage operating range, said first amplifier being connected to said first IR sensor;

at least a second amplifier having a second voltage operating range, said second amplifier being connected to said first IR sensor; and first and second comparators for respectively comparing the outputs of said first and second amplifier outputs respectively with a human threshold and hotter than human threshold.

19. The apparatus as described in claim 18 wherein said first amplifier operates at a lower voltage operating range than said second amplifier.

20. The apparatus as described in claim 18 said first amplifier saturates at an output from said sensor corresponding to the maximum signal as a result of the sensor sensing a human target.

21. The apparatus as described in claim 18 wherein said first and second comparators provide respective digital outputs corresponding to said first and second amplifiers respectively exceeding human and holler than human thresholds.

22. The apparatus as described in claim 18 wherein each of said amplifiers is a linear amplifier.

23. The apparatus as described in claim 18 wherein said hotter than human threshold is approximately 0.25 volts.

24. The apparatus as described in claim 18 wherein said second amplifier has a gain of approximately 150.

25. The apparatus as described in claim 18 wherein said human threshold is approximately 0.5 volts.

26. The apparatus as described in claim 18 wherein said second amplifier has a gain of approximately 150.

27. A method for differentiating between signals caused by human targets and other much larger IR sources which comprises:

providing at least a first IR sensor;

providing at least a first amplifier connected to said first IR sensor;

providing a second amplifier connected to said first IR sensor having a second operating range;

providing first and second comparators, and comparing the respective outputs of the first and second amplifiers to respective predetermined standards to identify a signal that is larger than the maximum signal from a human target.

28. The method as described in claim 27 wherein said step of providing a first amplifier includes providing an amplifier that will saturate at substantially the maximum signal from the sensor produced by a human target.

29. The method as described in claim 28 wherein the step of providing a first amplifier includes a first amplifier having first and second stages.

30. The method as described in claim 27 wherein the step of comparing the output to a predetermined standard includes the use of a comparator.

31. The method as described in claim 27 the step of comparing an amplifier output to a predetermined standard includes the use of at least one comparator that produces a digital output indicating a hotter than human threshold has been exceeded.

32. The method as described in claim 27 wherein the step of providing a first amplifier includes providing a first amplifier having first and second stages.

33. The method as described in claim 27 wherein said second predetermined standard is approximately 0.25 volts.

34. The method as described in claim 27 wherein said step of providing a second amplifier includes providing second amplifier that has a gain of approximately 150.

35. The method as described in claim 27 wherein the method further includes selecting the respective gains of the first and second amplifiers and the respective predetermined standards associated with the first and second comparators to cause the same one of the comparators to always trip before the other.

36. A method for differentiating between signals caused by human targets and other much larger IR sources which comprises:

providing at least a first IR sensor;

providing a first amplifier connected to said first IR sensor having a first operating range;

providing a second amplifier connected to said first IR sensor having a second operating range;

providing first and second comparators coupled to the outputs of the first and second amplifiers;

comparing the respective outputs of said first and second amplifiers to respective predetermined values corresponding to the maximum signal for human target and a signal that is larger than the maximum signal from a human target.

37. The method as described in claim 36 wherein said step of providing a first amplifier includes providing an amplifier that will saturate at substantially the maximum signal from the sensor produced by human target.

38. The method as described in claim 36 wherein the step of comparing the outputs includes the use of a comparator.

39. The method as described in claim 36 wherein the step of comparing the respective amplifier outputs includes the use of comparators that provide digital outputs respectively indicating amplifiers having an output corresponding to exceeding human and hotter than human thresholds.

40. The method as described in claim 36 wherein the step of providing a first amplifier includes providing a first amplifier having first and second stages.

41. The method as described in claim 36 wherein the signal corresponding to the maximum signal for human target is approximately 0.5 volts.

42. The method as described in claim 36 wherein the step of providing a second amplifier includes providing an amplifier that has has a gain of approximately 150.

43. The method as described in claim 36 wherein the maximum signal from a human target is approximately 0.25 volts.

44. The method as described in claim 36 wherein the step of providing a second amplifier includes providing second amplifier that has a gain of approximately 150.

* * * * *